(12) United States Patent
Liu

(10) Patent No.: US 8,744,497 B2
(45) Date of Patent: Jun. 3, 2014

(54) METHOD AND MOBILE COMMUNICATION DEVICE CAPABLE OF AVOIDING INTERRUPTION DUE TO INCOMING CALL

(75) Inventor: Wei-wei Liu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 116 days.

(21) Appl. No.: 13/547,074

(22) Filed: Jul. 12, 2012

(65) Prior Publication Data

US 2013/0295971 A1 Nov. 7, 2013

(30) Foreign Application Priority Data

May 4, 2012 (CN) .......................... 2012 1 0137326

(51) Int. Cl.
*H04W 68/00* (2009.01)
(52) U.S. Cl.
USPC ........... 455/458; 455/558; 455/418; 455/572; 455/567

(58) Field of Classification Search
USPC .......................... 455/458, 558, 418, 572, 567
See application file for complete search history.

(56) References Cited

U.S. PATENT DOCUMENTS

| 7,499,733 | B2 | 3/2009 | Burgan | |
|---|---|---|---|---|
| 2011/0244895 | A1* | 10/2011 | Wen | 455/466 |
| 2012/0108294 | A1* | 5/2012 | Kaul | 455/558 |

* cited by examiner

*Primary Examiner* — Khalid Shaheed
(74) *Attorney, Agent, or Firm* — Winston Hsu; Scott Margo

(57) ABSTRACT

A method capable of avoiding interruption due to incoming call is adapted to a mobile communication device. A subscriber identity module (SIM) card is installed on the mobile communication device. The method includes steps of setting a non-interruption period; retrieving an incoming call time of an incoming call signal when receiving the incoming call signal; determining whether the incoming call time is within the non-interruption period; stopping to supply power to the SIM card if the incoming call time is within the non-interruption period; and normally supplying power to the SIM card if the incoming call time is not within the non-interruption period.

12 Claims, 4 Drawing Sheets

METHOD AND MOBILE COMMUNICATION DEVICE CAPABLE OF AVOIDING INTERRUPTION DUE TO INCOMING CALL

BACKGROUND OF THE INVENTION

1. Field of the Invention

The invention relates to a mobile communication device and, more particularly, to a method, which is adapted to a mobile communication device, capable of avoiding interruption due to incoming call.

2. Description of the Prior Art

As technology advances and develops, mobile communication device has been considered a necessity by a lot of people. Although a user can use a mobile communication device to communicate with someone conveniently, there are still some inconveniences in using the mobile communication device. For example, the user may be often interrupted by a sudden incoming call or short message when he or she is sleeping, dating, meeting, vacationing, driving or busy for something. At those conditions, it may be inconvenient for the user to answer the incoming call or reply the short message promptly so that it may embarrass the user or cause a misunderstanding. Furthermore, it is dangerous for the user to drive and answer the incoming call or reply the short message at the same time. In general, the user can only switch the mobile communication device to a silent mode or a vibration mode so as to avoid the aforesaid interruption. However, the user may miss important incoming call or short message if he or she forgets to switch the mobile communication device from the silent mode or the vibration mode to a ring mode.

SUMMARY OF THE INVENTION

The invention provides a method and a mobile communication device capable of avoiding interruption due to incoming call so as to solve the aforesaid problems.

According to the claimed invention, a method capable of avoiding interruption due to incoming call is adapted to a mobile communication device. A subscriber identity module (SIM) card is installed on the mobile communication device. The method comprises steps of setting a non-interruption period; retrieving an incoming call time of an incoming call signal when receiving the incoming call signal; determining whether the incoming call time is within the non-interruption period; stopping to supply power to the SIM card if the incoming call time is within the non-interruption period; and normally supplying power to the SIM card if the incoming call time is not within the non-interruption period.

According to the claimed invention, the non-interruption period comprises a starting date, a starting time, an ending date and an ending time.

According to the claimed invention, the method further comprises steps of setting a task name corresponding to the non-interruption period; and storing the non-interruption period and the task name.

According to the claimed invention, a power pin of the SIM card is electrically connected to a control circuit through a switch and the method further comprises steps of sending out a disable signal to control the control circuit to switch off the switch so as to stop to supply power to the SIM card if the incoming call time is within the non-interruption period; and sending out an enable signal to control the control circuit to switch on the switch so as to normally supply power to the SIM card if the incoming call time is not within the non-interruption period.

According to the claimed invention, the method further comprises step of storing information of the incoming call signal in a built-in memory of the SIM card if the incoming call time is within the non-interruption period.

According to the claimed invention, the method further comprises step of normally supplying power to the SIM card and displaying the information of the incoming call signal after the non-interruption period.

According to the claimed invention, a mobile communication device is capable of avoiding interruption due to incoming call and a subscriber identity module (SIM) card is installed on the mobile communication device. The mobile communication device comprises an input unit for setting a non-interruption period; a memory unit for storing the non-interruption period; a switch; a control circuit, a power pin of the SIM card being electrically connected to the control circuit through the switch; a communication unit for receiving an incoming call signal; and a processing unit electrically connected to the input unit, the memory unit, the control unit and the communication unit; wherein the processing unit retrieves an incoming call time of the incoming call signal and determines whether the incoming call time is within the non-interruption period when the communication unit receives the incoming call signal; the processing unit sends out a disable signal to control the control circuit to switch off the switch so as to stop to supply power to the SIM card if the incoming call time is within the non-interruption period; and the processing unit sends out an enable signal to control the control circuit to switch on the switch so as to normally supply power to the SIM card if the incoming call time is not within the non-interruption period.

According to the claimed invention, the non-interruption period comprises a starting date, a starting time, an ending date and an ending time.

According to the claimed invention, the input unit is used for setting a task name corresponding to the non-interruption period and the memory unit is used for storing the task name.

According to the claimed invention, the control circuit comprises a register for switching off the switch according to the disable signal and switching on the switch according to the enable signal.

According to the claimed invention, information of the incoming call signal is stored in a built-in memory of the SIM card if the incoming call time is within the non-interruption period.

According to the claimed invention, the mobile communication device further comprises a display unit electrically connected to the processing unit, wherein the processing unit sends out the enable signal to control the control circuit to switch on the switch so as to normally supply power to the SIM card and displays the information of the incoming call signal on the display unit after the non-interruption period.

As mentioned in the above, the invention allows a user to set different non-interruption periods for different conditions, such as when he or she is sleeping, dating, meeting, vacationing, driving or busy for something. The invention will stop to supply power to the SIM card through the control circuit if the incoming call time of the incoming call signal is within the non-interruption period such that the SIM card will be switched to an idle state. On the other hand, the invention will normally supplies power to the SIM card through the control circuit if the incoming call time of the incoming call signal is not within the non-interruption period such that the SIM card will be switched to a normal work state. It should be noted that the aforesaid incoming call signal may be a phone call or a short message. Furthermore, the information of the incoming call signal (e.g. incoming call number, incoming call time, short message, etc.) may be stored in the built-in memory of the SIM card during the non-interruption period and the invention will normally supply power to the SIM card through the control circuit and display the information of the incoming call signal on the display unit of the mobile communication device after the non-interruption period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
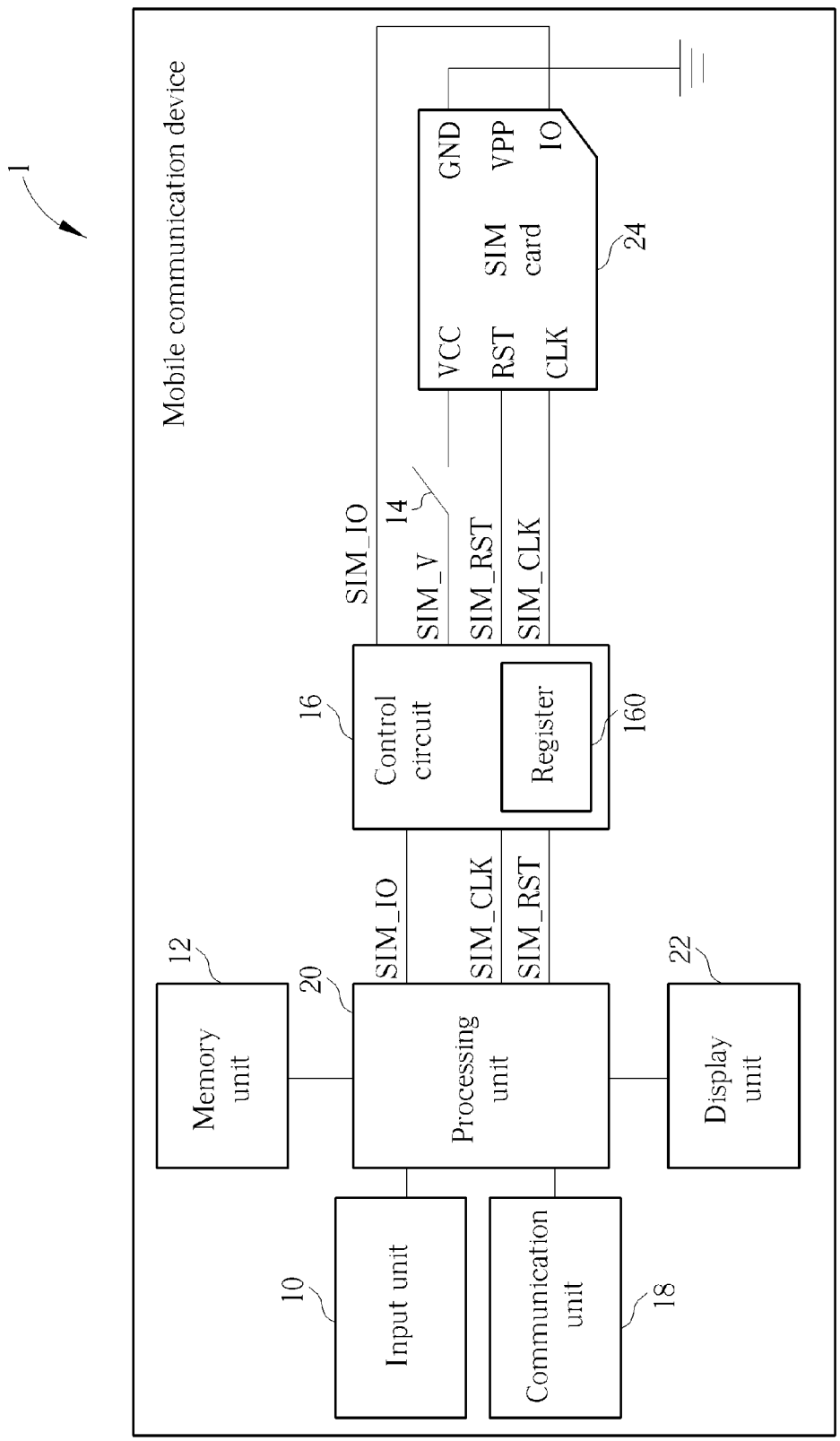
FIG. 1 is a functional block diagram illustrating a mobile communication device capable of avoiding interruption due to incoming call according to an embodiment of the invention.
Figure 2:
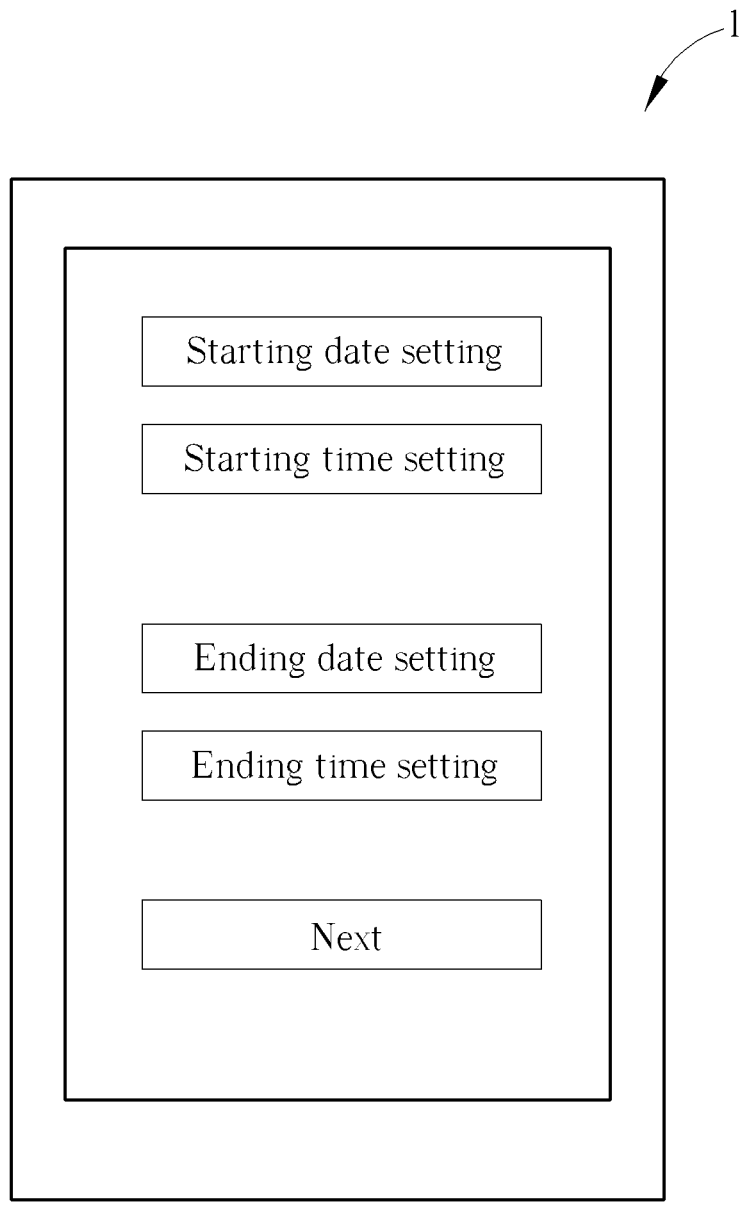
FIG. 2 is a schematic diagram illustrating a first setting interface displayed by the mobile communication device shown in FIG. 1.
Figure 3:
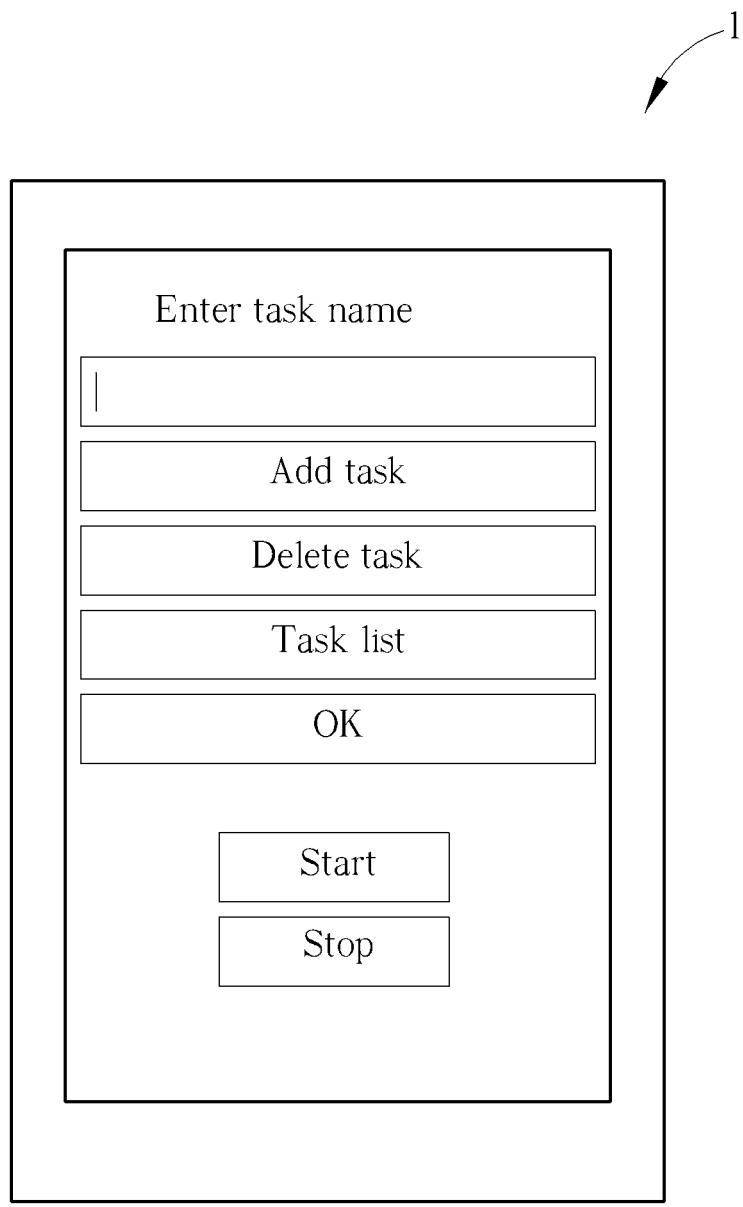
FIG. 3 is a schematic diagram illustrating a second setting interface displayed by the mobile communication device shown in FIG. 1.

Referring to FIGS. 1 to 3, FIG. 1 is a functional block diagram illustrating a mobile communication device 1 capable of avoiding interruption due to incoming call according to an embodiment of the invention, FIG. 2 is a schematic diagram illustrating a first setting interface displayed by the mobile communication device 1 shown in FIG. 1, and FIG. 3 is a schematic diagram illustrating a second setting interface displayed by the mobile communication device 1 shown in FIG. 1.

As shown in FIG. 1, the mobile communication device 1 comprises an input unit 10, a memory unit 12, a switch 14, a control circuit 16, a communication unit 18, a processing unit 20 and a display unit 22. Furthermore, a subscriber identity module (SIM) card 24 is installed on the mobile communication device 1. In this embodiment, the mobile communication device 1 may be any electronic devices with communication function; the input device 10 may be a touch panel or other input devices; the memory unit 12 may be a memory or other data storage devices; the communication unit 18 may be a wireless communication module (e.g. Wi-Fi, 3G/4G, etc.); the processing unit 20 may be a processor or c controller with data processing function; and the display unit 22 may be a liquid crystal display device or other display devices.

As show in FIG. 1, the processing unit 20 is electrically connected to the input unit 10, the memory unit 12, the control unit 16, the communication unit 18 and the display unit 22, and a power pin VCC of the SIM card 24 is electrically connected to the control circuit 16 through the switch 14. In general, the SIM card 24 may further has a reset pin RST, a clock pin CLK, a ground pin GND, a programming pin VPP and an input/output pin IO except the power pin VCC. Furthermore, SIM_CLM represents a reference clock signal line for writing/reading the SIM card 24, SIN_RST represents a reset signal line for resetting the SIM card 24, SIM_IO represents a serial data input/output line, and SIM_V represents a power supply line for the control circuit 16 to supply power to the SIM card 24. It should be noted that the principles of the power pin VCC, the reset pin RST, the clock pin CLK, the ground pin GND, the programming pin VPP and the input/output pin IO are known by one skilled in the art and will not be depicted herein.

The input unit 10 is used for setting a non-interruption period and a task name corresponding to the non-interruption period, wherein the non-interruption period comprises a starting date, a starting time, an ending date and an ending time. The memory unit 12 is used for storing the non-interruption period and the corresponding task name. The control circuit 16 comprises a register 160 for switching off the switch 14 according to a disable signal and switching on the switch 14 according to an enable signal. The communication unit 18 is used for receiving an incoming call signal, wherein the incoming call signal may be a phone call or a short message.

In this embodiment, a user can operate the input unit 10 to input a non-interruption period including a starting date, a starting time, an ending date and an ending time in the first setting interface shown in FIG. 2 and then clicks "next" button to enter the second setting interface shown in FIG. 3. Afterward, the user can operate the input unit 10 to input a task name (e.g. sleeping, dating, meeting, vacationing, driving, etc.) corresponding to the non-interruption period in the second setting interface shown in FIG. 3. The user may set a plurality of task names and corresponding non-interruption periods for different conditions. Then, the user can operate the input unit 10 to click "start" or "stop" button in the second setting interface shown in FIG. 3 so as to execute or terminate a specific task.

When a specific task is being executed and the communication unit 18 receives an incoming call signal, the processing unit 20 will retrieve an incoming call time of the incoming call signal and determine whether the incoming call time is within the non-interruption period of the task. The incoming call time may be provided by a time management application. If the incoming call time is within the non-interruption period, the processing unit 20 will send out a disable signal (e.g. logic signal "0") to control the register 160 of the control circuit 16 to switch off the switch 14 so as to stop to supply power to the power pin VCC of the SIM card 24. At this time, the SIM card 24 will be switched to an idle state such that the mobile communication device 1 cannot receive any phone calls or short messages accordingly. On the other hand, if the incoming call time is not within the non-interruption period, the processing unit 20 will send out an enable signal (e.g. logic signal "1") to control the register 160 of the control circuit 16 to switch on the switch 14 so as to normally supply power to the power pin VCC of the SIM card 24. At this time, the SIM card 24 will be switched to a normal work state such that the mobile communication device 1 can receive any phone calls or short messages normally.

It should be noted that information of the incoming call signal (e.g. incoming call number, incoming call time, short message, etc.) may be stored in a built-in memory (not shown) of the SIM card 24 during the non-interruption period. The processing unit 20 will send out the enable signal to control the register 160 of the control circuit 16 to switch on the switch 14 so as to normally supply power to the power pin VCC of the SIM card 24 and display the information of the incoming call signal on the display unit 22 after the non-interruption period. Accordingly, the user can call someone back or reply short message to someone in time after the non-interruption period.

Figure 4:
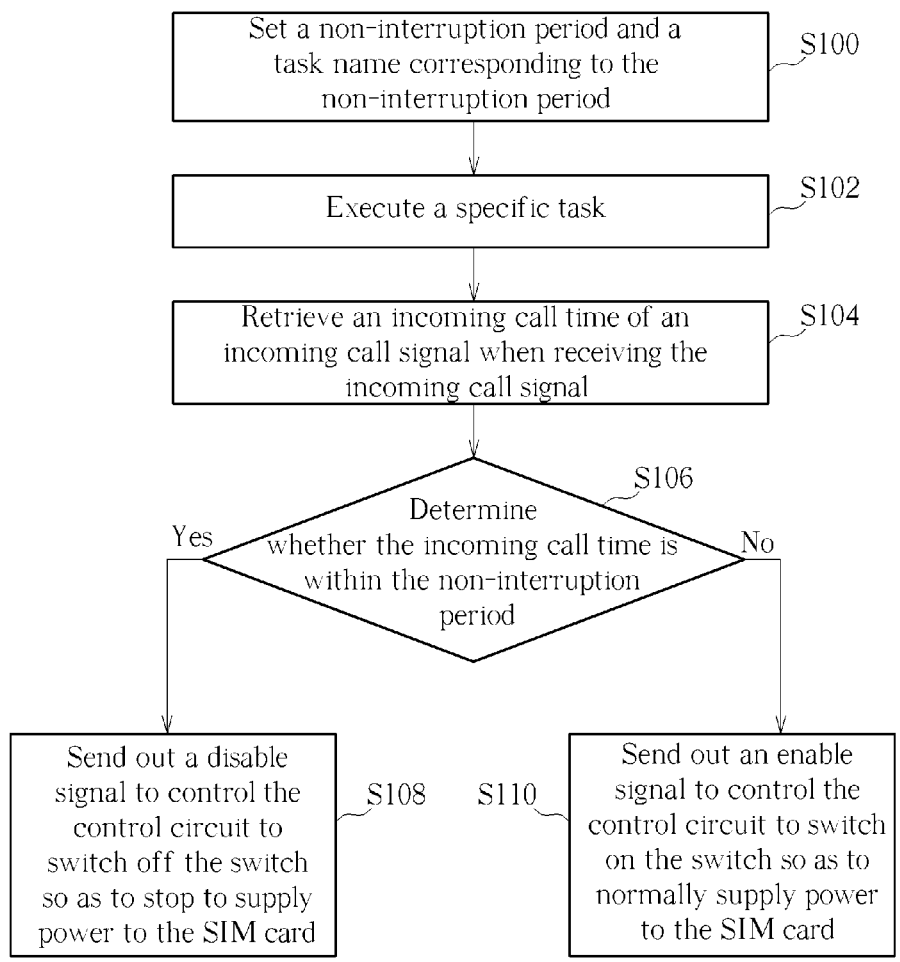
FIG. 4 is a flowchart illustrating a method capable of avoiding interruption due to incoming call according to an embodiment of the invention.

Referring to FIG. 4, FIG. 4 is a flowchart illustrating a method capable of avoiding interruption due to incoming call according to an embodiment of the invention. The method capable of avoiding interruption due to incoming call shown in FIG. 4 is adapted to the mobile communication device 1 shown in FIG. 1. First of all, step S100 is performed to set a non-interruption period and a task name corresponding to the non-interruption period. Afterward, step S102 is performed to execute a specific task. Step S104 is then performed to retrieve an incoming call time of an incoming call signal when receiving the incoming call signal. Step S106 is then performed to determine whether the incoming call time is within the non-interruption period. If the incoming call time is within the non-interruption period, step S108 is performed to send out a disable signal to control the control circuit 16 to switch off the switch 14 so as to stop to supply power to the SIM card 24. If the incoming call time is not within the non-interruption period, step S110 is performed to send out an enable signal to control the control circuit 16 to switch on the switch 14 so as to normally supply power to the SIM card 24. It should be noted that the detailed operation and principle are mentioned in the above and will not be depicted herein again.

Furthermore, the control logics of the first setting interface shown in FIG. 2, the second setting interface shown in FIG. 3, and the method shown in FIG. 4 can be implemented by software. It is reasonably expected that each part or function of the control logics may be implemented by software, hardware or the combination thereof. Moreover, the control logics can be embodied by a computer readable storage medium, wherein the computer readable storage medium stores instructions, which can be executed by the mobile communication device 1 so as to generate control command for controlling the mobile communication device 1 to execute corresponding function.

As mentioned in the above, the invention allows a user to set different non-interruption periods for different conditions, such as when he or she is sleeping, dating, meeting, vacationing, driving or busy for something. The invention will stop to supply power to the SIM card through the control circuit if the incoming call time of the incoming call signal is within the non-interruption period such that the SIM card will be switched to an idle state. On the other hand, the invention will normally supplies power to the SIM card through the control circuit if the incoming call time of the incoming call signal is not within the non-interruption period such that the SIM card will be switched to a normal work state. It should be noted that the aforesaid incoming call signal may be a phone call or a short message. Furthermore, the information of the incoming call signal (e.g. incoming call number, incoming call time, short message, etc.) may be stored in the built-in memory of the SIM card during the non-interruption period and the invention will normally supply power to the SIM card through the control circuit and display the information of the incoming call signal on the display unit of the mobile communication device after the non-interruption period.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method capable of avoiding interruption due to incoming call adapted to a mobile communication device, the mobile communication device comprising a switch and a control circuit, a subscriber identity module (SIM) card being installed on the mobile communication device, a power pin of the SIM card being electrically connected to the control circuit through the switch, the method comprising:
setting a non-interruption period;
retrieving an incoming call time of an incoming call signal when receiving the incoming call signal;
determining whether the incoming call time is within the non-interruption period;
controlling by the control circuit of the mobile communication device to switch off the switch automatically so as to stop to supply power to the SIM card if the incoming call time is within the non-interruption period; and
controlling by the control circuit of the mobile communication device to switch on the switch automatically so as to normally supply power to the SIM card if the incoming call time is not within the non-interruption period.

2. The method of claim 1, wherein the non-interruption period comprises a starting date, a starting time, an ending date and an ending time.

3. The method of claim 1, further comprising:
setting a task name corresponding to the non-interruption period; and
storing the non-interruption period and the task name.

4. The method of claim 1, wherein a power pin of the SIM card is electrically connected to a control circuit through a switch, the method further comprises:
sending out a disable signal to control the control circuit to switch off the switch so as to stop to supply power to the SIM card if the incoming call time is within the non-interruption period; and
sending out an enable signal to control the control circuit to switch on the switch so as to normally supply power to the SIM card if the incoming call time is not within the non-interruption period.

5. The method of claim 1, further comprising:
storing information of the incoming call signal in a built-in memory of the SIM card if the incoming call time is within the non-interruption period.

6. The method of claim 5, further comprising:
normally supplying power to the SIM card and displaying the information of the incoming call signal after the non-interruption period.

7. A mobile communication device capable of avoiding interruption due to incoming call, a subscriber identity module (SIM) card being installed on the mobile communication device, the mobile communication device comprising:
an input unit for setting a non-interruption period;
a memory unit for storing the non-interruption period;
a switch;
a control circuit, a power pin of the SIM card being electrically connected to the control circuit through the switch;
a communication unit for receiving an incoming call signal; and
a processing unit electrically connected to the input unit, the memory unit, the control unit and the communication unit;
wherein the processing unit retrieves an incoming call time of the incoming call signal and determines whether the incoming call time is within the non-interruption period when the communication unit receives the incoming call signal; the processing unit sends out a disable signal to control the control circuit to switch off the switch so as to stop to supply power to the SIM card if the incoming call time is within the non-interruption period; and the processing unit sends out an enable signal to control the control circuit to switch on the switch so as to normally supply power to the SIM card if the incoming call time is not within the non-interruption period.

8. The mobile communication device of claim 7, wherein the non-interruption period comprises a starting date, a starting time, an ending date and an ending time.

9. The mobile communication device of claim 7, wherein the input unit is used for setting a task name corresponding to the non-interruption period and the memory unit is used for storing the task name.

10. The mobile communication device of claim 7, wherein the control circuit comprises a register for switching off the switch according to the disable signal and switching on the switch according to the enable signal.

11. The mobile communication device of claim 7, wherein information of the incoming call signal is stored in a built-in memory of the SIM card if the incoming call time is within the non-interruption period.

12. The mobile communication device of claim 11, further comprising a display unit electrically connected to the processing unit, wherein the processing unit sends out the enable signal to control the control circuit to switch on the switch so as to normally supply power to the SIM card and displays the information of the incoming call signal on the display unit after the non-interruption period.

\* \* \* \* \*